Patented July 16, 1935

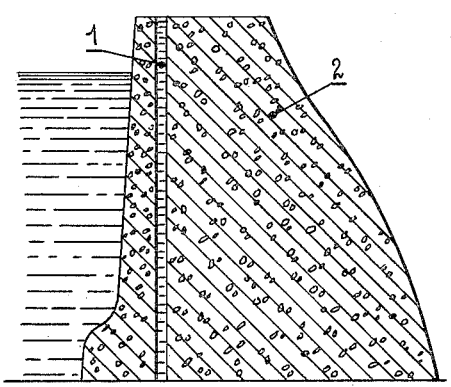
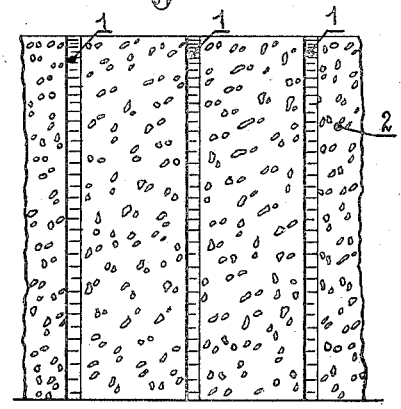
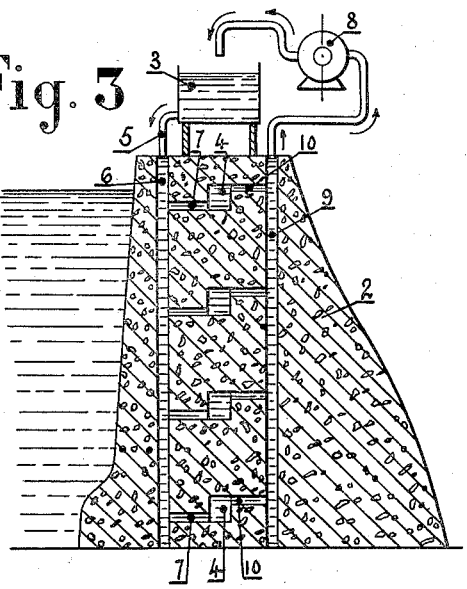
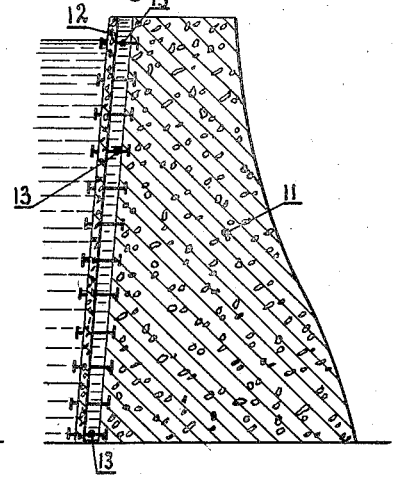
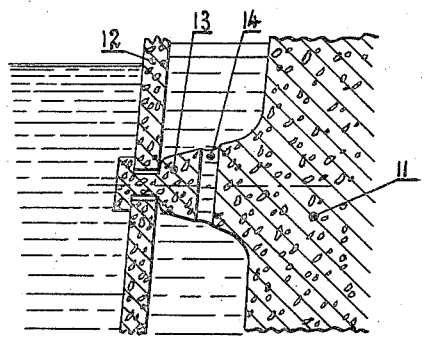

2,008,472

UNITED STATES PATENT OFFICE 2,008,472

METHOD FOR PROTECTING CONCRETE STRUCTURES

Jean Charles Séailles, Paris, France

Application February 12, 1934, Serial No. 710,937
In Luxemburg February 20, 1933

2 Claims. (Cl. 61—30)

I have filed application in the Great Dutchy of Luxemburg on February 20th, 1933.

The object of the present invention is a method for the protection of concrete structures against the destructive action of water.

It is known that water has a dissolving action on the components of cement, the effects of which, in certain cases, result in the more or less complete destruction of the structures, of which hydraulic cements, chalk and its derivatives form the essential components.

It is equally known that the more acid the water contains the stronger is the deteriorating action of same, and on the contrary the destructive action of alkaline water disappears when its alkaline index is sufficiently high.

If, for example, we express the acid and the alkaline contents by the index pH, a water would have a greater deteriorating effect the lower its index is. Commencing from index 8, the action becomes negligible and for still higher indexes, there would be no alteration possible whatever.

Further, saline waters of various composition (sea water, gypsum containing water or the like) often have a destructive effect on the components of the more ordinary cements, due to the reaction of the dissolved salts that they contain.

Water acts on a concrete structure chiefly in two ways, either by washing the surface or by slowly penetrating through the mass.

In the case where the water washes the surface the soluble components of the cement gradually and continuously dissolve and more so if the water is not stagnant.

Water which penetrates the mass carries away the soluble matters with which it saturates itself, with the intensifying circumstance that the original porosity increases with the time and the destructive action spreads accordingly.

In the case of saline water the action is more complex on account of the action of the dissolved salts.

The method of the invention consists principally in arranging that the soluble components necessarily carried away by the water should be chiefly derived, not from the structure to be preserved, but from a source entirely independent of it and which can be eventually renewed.

For this purpose, it is to be arranged that the water, satured with the necessary elements to ensure it a suitable composition or pH, should be distributed throughout the mass of the structure to be protected in such a manner that the said mass would be able to stand, not as a permeable and soluble entirety, which cannot be exposed without losing its soluble components, but on the contrary as an entirety of which the saturation with soluble components is artificially maintained at a desired degree in spite of the process of diffusion.

In addition, the liquid saturating the mass could be brought into action in accordance with the external influence so that in face of an inevitable porosity the mass reacts, not as a filter traversed by water which wears away or alters the filtering matter in the case of saline waters, but on the contrary as a source giving out water which at best would be incrustating water or at worst, water previously deprived of its dissolving power. This method of procedure would in addition protect, if need be, the structure against the penetration of saline waters.

With these general statements of the objects and purposes of my invention, I will now proceed to describe the embodiment thereof and the manner in which my invention is carried out and it will be understood that while I have described what may be considered as a preferable embodiment of my invention, I do not limit myself to the precise conditions herein set forth, as they may be varied by those skilled in the art in accordance with the particular purposes for which they are intended and the conditions under which they are to be utilized.

Fig. 1 is a cross section of a structure in which the invention is realized by means of vertical holes bored into the thickness of a structure.

Fig. 2 is a longitudinal section of the same structure.

Fig. 3 is a cross section of a structure, in which the invention is realized by means of channels and vertical holes worked into the thickness of the structure and of an external trough containing a solution of suitable composition.

Fig. 4 is a diagrammatical cross section showing one embodiment of the invention by means of a shield.

Fig. 5 is an enlargement of a part of Fig. 4.

In the embodiment shown by Figures 1 and 2, pits or vertical holes 1 have been bored or worked into the thickness of the masonry 2 of the structure; these pits or holes are filled with a soluble mass of substances with alkaline reaction; this mass can be preferably a mixture of water and hydrate of chalk; they could also be filled with a watered solution of alkaline substances, dosed in such a manner that the pH of the alkaline reaction of the said solution is superior to 8. It will be generally found advantageous to maintain a slight hydraulic super-pressure in the pits or holes so that the flow is constantly moving through the structure from the interior to the exterior.

The soluble mass can also be placed on the outside of the structure; in this case, as shown in Fig. 3, an alkaline solution of pH superior to 8 or a sufficiently liquid mixture of water and hydrate of chalk is placed in the trough 3; this solution or mixture is made to circulate in the transversal passages 4 arranged above one another in the interior of the structure 2; for this purpose the trough is connected by channels 5 to pits 6 worked into the masonry; the pits connect with the passages by means of channels 7, the liquid or the mixture is withdrawn from the passages by means of a pump 8, driving into the pits 9 which connect with the passages 4 by channels 10; the pump 8 drives the solution or mixture into the trough 3. It is in the latter that the composition of the solution or mixture is, when necessary, brought up again to its desired strength.

Instead of a pump driving into the pits 9, a pump could be affixed to eject the solution or mixture into the pits 6. By means of the arrangement described above, it is possible to regulate at will the speed of circulation of the solution or mixture, its pressure, its renewal, its alkaline index or the excess of reagents, in suspense in solid form.

The trough 3 may be placed in any suitable position with respect to the structure; it will be generally found advantageous to place it on a higher level than the structure in order to have a natural superpressure to facilitate the circulation of the solution or mixture throughout the system of channels in the structure.

The Figures 4 and 5 represent another embodiment of the invention; 11 represents a wall of a dam; on top of this wall and at a slight distance a shield 12 is fixed to the wall by means of horizontal ties 13 which are solidly fastened both to the wall and to the shield. These ties have a hollow 14. In the empty space between the shield and the wall of the dam a soluble mass of alkaline substances, for example a mixture of water and hydrate of chalk or a solution having an alkaline reaction of pH superior to 8, is maintained. It will be generally found advantageous to maintain a slight hydraulic superpressure in the interior of the shield.

It has been found that cement work of all kinds always loses in its lime qualities through water (rain) and are thus more or less dissolved, the loss per year being from 100 to 500 tons of lime, also, it has been noted that corrosive actions take place at the interior of any of the cement work which has been done.

To prevent the above defects so far external products have been used to cover the work so as to preserve its interior parts. Chemicals have been used in the mixture which stopped the pores of the construction, so that all prior objections would be overcome, and one has tried to stop up the passages or holes so as to prevent water from penetrating into the finished work.

Different coats of material have been used to paint on to the work. All of these solutions and chemicals are expensive and not practical and do not last any great length of time, and rarely can be replaced, when the work has crumbled, especially in large works of construction.

My idea is quite different. The work is permitted to be saturated by water, letting the water filter through the same, no chemicals or artificial products are used and water is constantly allowed to flow through the finished cement construction, as will be readily seen by the drawing.

I claim:

1. A process of protecting concrete structures against the dissolving and destructive action caused by water on the soluble substances which are included in the composition of the cement of the structure, consisting in working passages in the thickness of the structure, placing a trough at a distance from the structure, supplying said trough with a solution which has an alkaline reaction of a pH superior to 8, connecting said trough with the said passages, and circulating said solution through the passages.

2. A process of protecting concrete structures against the dissolving and destructive action caused by water on the soluble substances which are included in the composition of the cement of the structure, consisting in working passages in the thickness of the structure, placing a trough at a distance from the structure, supplying said trough with a mixture of water and hydrate of chalk, connecting said trough with the said passages, and circulating said mixture through said passages.

JEAN CHARLES SÉAILLES.